(12) United States Patent
Yoshikawa et al.

(10) Patent No.: US 8,194,313 B2
(45) Date of Patent: Jun. 5, 2012

(54) MICROSCOPE AND LAMPHOUSE

(75) Inventors: Akihiko Yoshikawa, Hachioji (JP);
Atsuhiro Tsuchiya, Hachioji (JP);
Masahiro Aoki, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/051,857

(22) Filed: Mar. 18, 2011

(65) Prior Publication Data

US 2011/0170181 A1    Jul. 14, 2011

Related U.S. Application Data

(62) Division of application No. 11/586,033, filed on Oct. 25, 2006, now abandoned.

(30) Foreign Application Priority Data

Oct. 26, 2005  (JP) ................................. 2005-311559
Sep. 14, 2006  (JP) ................................. 2006-249839

(51) Int. Cl.
*G02B 21/06* (2006.01)
*F21V 9/16* (2006.01)
(52) U.S. Cl. ......................................... 359/385; 362/84
(58) Field of Classification Search .................. 359/368, 359/385–390; 356/317; 362/84, 575
See application file for complete search history.

(56) References Cited

U.S. PATENT DOCUMENTS

| 4,113,344 | A  | * | 9/1978  | Shoemaker ..................... 359/382 |
| 6,369,939 | B1 | * | 4/2002  | Weiss et al. ..................... 359/387 |
| 6,674,575 | B1 |   | 1/2004  | Tandler et al. |
| 6,809,861 | B2 |   | 10/2004 | Kawasaki et al. |
| 2002/0030444 | A1 |   | 3/2002 | Muller-Mach et al. |
| 2003/0042493 | A1 |   | 3/2003 | Kazakevich |
| 2004/0164307 | A1 |   | 8/2004 | Mueller-Mach et al. |
| 2005/0023546 | A1 |   | 2/2005 | Menkara et al. |
| 2005/0047172 | A1 |   | 3/2005 | Sander |
| 2005/0213205 | A1 | * | 9/2005 | Roeth et al. ..................... 359/385 |
| 2005/0242362 | A1 |   | 11/2005 | Shimizu et al. |
| 2005/0276553 | A1 |   | 12/2005 | Kazakevich |

FOREIGN PATENT DOCUMENTS

| JP | 10-216085 A | 8/1998 |
| JP | 2003-215461 A | 7/2003 |
| JP | 2005-148296 A | 6/2005 |
| JP | 2005-205195 A | 8/2005 |
| JP | 2005-294288 A | 10/2005 |
| WO | WO 01/024283 A1 | 4/2001 |
| WO | WO 03/021329 A2 | 3/2003 |
| WO | WO 2007/003275 A1 | 1/2007 |

OTHER PUBLICATIONS

European Office Action dated Jan. 15, 2008 issued in a counterpart European Application.
Letter of Applicant dated May 14, 2007, which was submitted to the European Patent Office and which is referred to in the European Office Action.
Japanese Office Action dated Oct. 18, 2011 (and English translation thereof) in counterpart Japanese Application No. 2006-249839.

* cited by examiner

*Primary Examiner* — Alessandro Amari
(74) *Attorney, Agent, or Firm* — Holtz, Holtz, Goodman & Chick, PC

(57) ABSTRACT

A microscope includes an illuminating unit that includes an excitation light source emitting an excitation light, and a phosphor receiving the excitation light and emitting illumination light in a specific wavelength range. The illuminating unit illuminates a specimen with the illumination light. The microscope also includes an observation unit for observing the specimen illuminated by the illuminating unit.

8 Claims, 7 Drawing Sheets

MICROSCOPE AND LAMPHOUSE

CROSS-REFERENCE TO RELATED APPLICATIONS

This is a Divisional of U.S. application Ser. No. 11/586,033, filed Oct. 25, 2006 now abandoned, which is based upon and claims the benefit of priority from Japanese Patent Application No. 2005-311559, filed Oct. 26, 2005; and Japanese Patent Application No. 2006-249839, filed Sep. 14, 2006, the entire contents of all of which are incorporated herein by reference.

BACKGROUND OF THE INVENTION

1. Field of the Invention

The present invention relates to a microscope.

2. Description of the Related Art

Japanese Patent Application Laid-open No. 2005-205195 (KOKAI) discloses a technique that generates illumination light by exiting a phosphor with a laser diode. This technique, in which the laser diode and the phosphor are connected by an optical fiber, is applied to endoscopes.

Japanese Patent Application Laid-open No. 2003-215461 (KOKAI) discloses a configuration that includes a white LED light source used as a light source for an illumination optical system of a microscope.

Illumination by halogen lamp is known. The halogen lamp has wavelength characteristics depending on the intensity of the emitting light. In contrast, the illumination by the phosphor or the LED light source has light-intensity-independent wavelength characteristics. However, the light emitted from the white LED light source is a little dark, and thus is not suitable for an illumination light source for microscopes. The illumination by the phosphor is used for endoscopes but makes it for microscopes difficult to use with general arrangement.

SUMMARY OF THE INVENTION

A microscope according to one aspect of the present invention includes an illuminating unit that includes an excitation light source emitting an excitation light, and a phosphor receiving the excitation light and emitting illumination light in a specific wavelength range, the illuminating unit illuminating a specimen with the illumination light; and an observation unit for observing the specimen illuminated by the illuminating unit.

A lamphouse according to another aspect of the present invention includes an excitation light source that emits an excitation light; and a phosphor that receives the excitation light and emits illumination light in a specific wavelength range. The lamphouse is detachably mounted to a microscope body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the invention will be described below with reference to the accompanying drawings.

Figure 1:
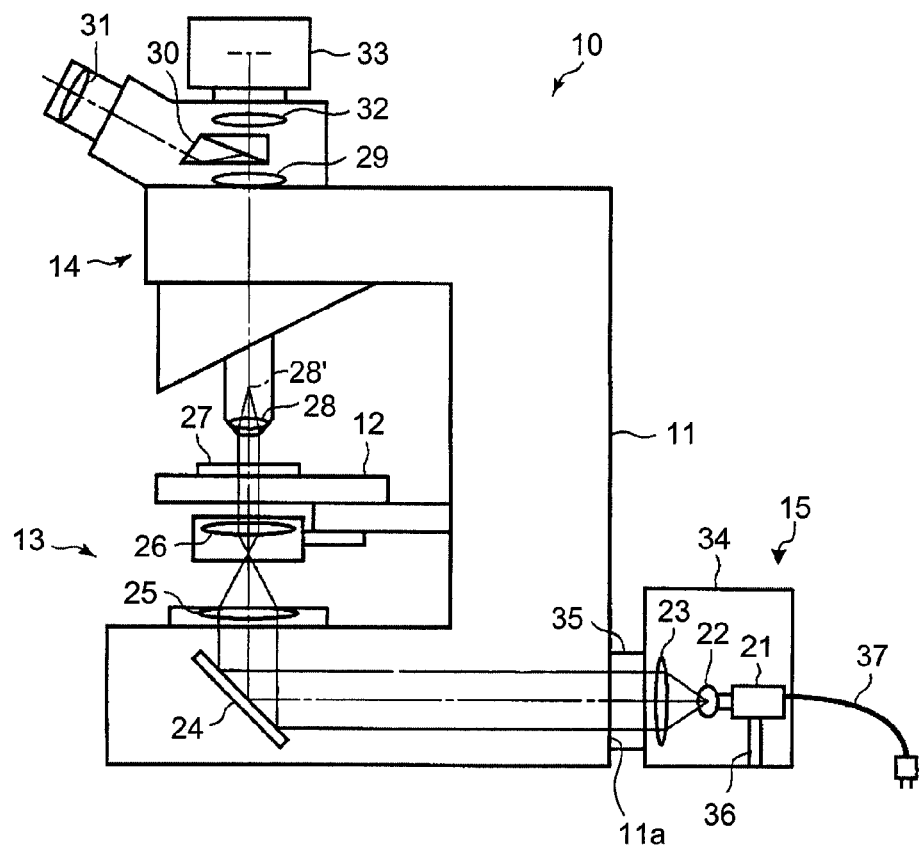
FIG. 1 shows a configuration of a microscope according to a first embodiment of the present invention.

FIG. 1 shows a configuration of a microscope and a lamphouse according to a first embodiment of the present invention.

Referring to FIG. 1, a microscope 10 includes a stage 12 that holds a specimen 27, a microscope body 11 that holds the stage 12, an illumination optical system 13 for illuminating the specimen 27, and an observation optical system 14 for observing the specimen 27.

The illumination optical system 13, being an illuminator, includes an excitation light source 21, a phosphor 22, a collector lens 23, a mirror 24, a window lens 25, and a condenser 26. Specifically, the illumination optical system 13 forms a transmitting illumination optical system to establish Kohler illumination. The observation optical system 14, being an observation unit, includes an objective lens 28, an imaging lens 29, a prism 30, an eyepiece 31, an image capturing lens 32, and a camera 33.

The excitation light source 21, the phosphor 22, and the collector lens 23 are housed in an exterior frame 34. The exterior frame 34 is detachably mounted to a mounting portion 11a of the microscope body 11 through a connecting unit 35. The excitation light source 21 is supported by a light source supporting member 36 that is mounted to the exterior frame 34. The excitation light source 21 is also powered by a power supply through a cable 37. The phosphor 22 is located in a focal position of the collector lens 23 with respect to the excitation light source 21, as shown in FIG. 2 for example.

Figure 2:
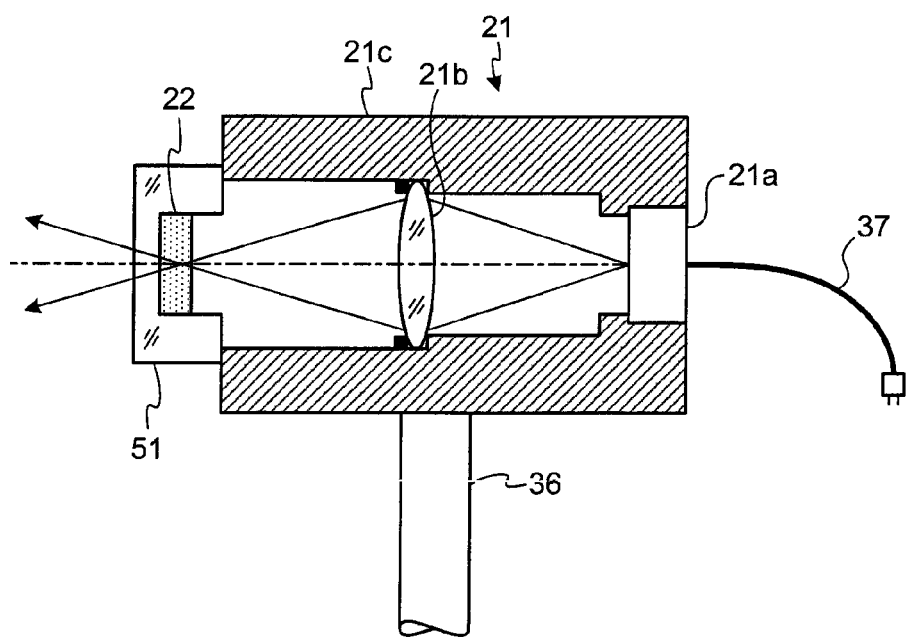
FIG. 2 shows a structure of an excitation light source included in the microscope shown in FIG. 1.

Referring to FIG. 2, the excitation light source 21 includes a light-emitting source 21a that emits excitation light in a predetermined wavelength range, a condensing lens 21b that condenses the excitation light emitted from the light-emitting source 21a on the phosphor 22, and a light source casing 21c in which the light-emitting source 21a and the condensing lens 21b are held together. The phosphor 22 is held in a transparent holding member 51 attached to the light source casing 21c. The transparent holding member 51 is removable from the light source casing 21c; the phosphor 22 is removable from the transparent holding member 51. In other words, the phosphor 22 can be replaced with another phosphor capable of emitting light with, for example, different wavelength characteristics (spectral characteristics) to illuminate the specimen 27.

The excitation light source 21 emits excitation light; the phosphor 22 receives the excitation light emitted from the excitation light source 21, thereby emitting illumination light in a specific wavelength range, for example, white illumination light. The excitation light source 21 consists of, for example, a laser diode (LD) light source. Specifically, the excitation light source 21 may be a light source module that includes a laser diode used as the light-emitting source 21a shown in FIG. 2 and an optical system such as a condensing lens. Alternatively, the LD light source may consist only of a single laser diode, where the phosphor 22 is directly attached to the light-emitting surface of the laser diode. The excitation light source 21 is not limited to the LD light source, and may consist of, for example, an LED in place of the laser diode.

The phosphor 22 consists of a fluorescent compound. The phosphor 22 preferably has the same size as the filament of a halogen lamp. In other words, the phosphor 22 preferably has a size that a conjugate image of the phosphor 22 is imaged to have a desired size by the collector lens 23 and the window lens 25 in the illumination optical system 13. An example of the desired size is a size of a filament image of the halogen lamp imaged by the collector lens 23 and the window lens 25.

The focal distance of the phosphor 22 is preferably set based on the size of the phosphor 22. Replacement of the collector lens 23 allows changing the focal distance of the collector lens 23. Hence, to establish Kohler illumination, it is possible to set the conjugate image of the phosphor 22, which is projected on the focal surface of the condenser 26, to a desired size regardless of the size of the phosphor 22.

Working of the microscope 10 according to the first embodiment will be described below. The excitation light source 21 emits excitation light to the phosphor 22. The phosphor 22 receives the excitation light emitted from the excitation light source 21 and thus emits illumination light in a specific wavelength range. The illumination light emitted from the phosphor 22 is collected by the collector lens 23 to go into the microscope body 11, and then reflected upward by the mirror 24. The illumination light reflected upward illuminates the specimen 27 through the window lens 25 and the condenser 26.

The image of the phosphor 22 is projected to infinity by the collector lens 23 and imaged in the focal position of the condenser 26 by the window lens 25, so that the illumination optical system 13 establishes Kohler illumination. The image of the phosphor 22 is then projected to infinity by the condenser 26, turns to parallel light in the surface of the specimen 27. The parallel light illuminates the specimen 27 and focuses in a back focal point 28' of the objective lens 28.

The image of the specimen 27 illuminated with the illumination light is magnified and projected to infinity by the objective lens 28, and the imaging lens 29 focuses the image. The focused light image is divided into two light paths: one light path extending to the eyepiece 31 through the prism 30, another light path extending to an image capturing lens 32 that focuses the image on the camera 33.

In the field of microscopy, illumination by a halogen lamp is widely known. The halogen lamp illumination, however, changes its wavelength characteristics depending on the light intensity. According to the first embodiment, by contrast, the wavelength characteristics of the illumination light does not depend on the light intensity because the illumination light is emitted from the phosphor 22 that is illuminated with excitation light to have a specific wavelength range. As a result, it is possible to provide illumination with no change in wavelength characteristics and with excellent color reproductivity.

According to the microscope 10 according to the first embodiment, the phosphor 22 absorbs the excitation light to emit the illumination light, and thus heat generation is reduced compared with the halogen lamp that directly emits illumination light. Specifically, the microscope 10 prevents out-of-focus on the specimen 27 which is caused by thermal deformation of the microscope body 11 due to the halogen lamp heat for example.

The illumination by the halogen lamp causes uneven light distribution due to inter-filament gaps even if Kohler illumination is established. This uneven light distribution is eliminated by using frost. In the microscope 10 according to the first embodiment, the phosphor 22 contains fluorescent material which is uniformly distributed thereover so as to have a plate shape with the same size as the filament, thereby providing illumination with even light distribution without using frost.

Figure 3:
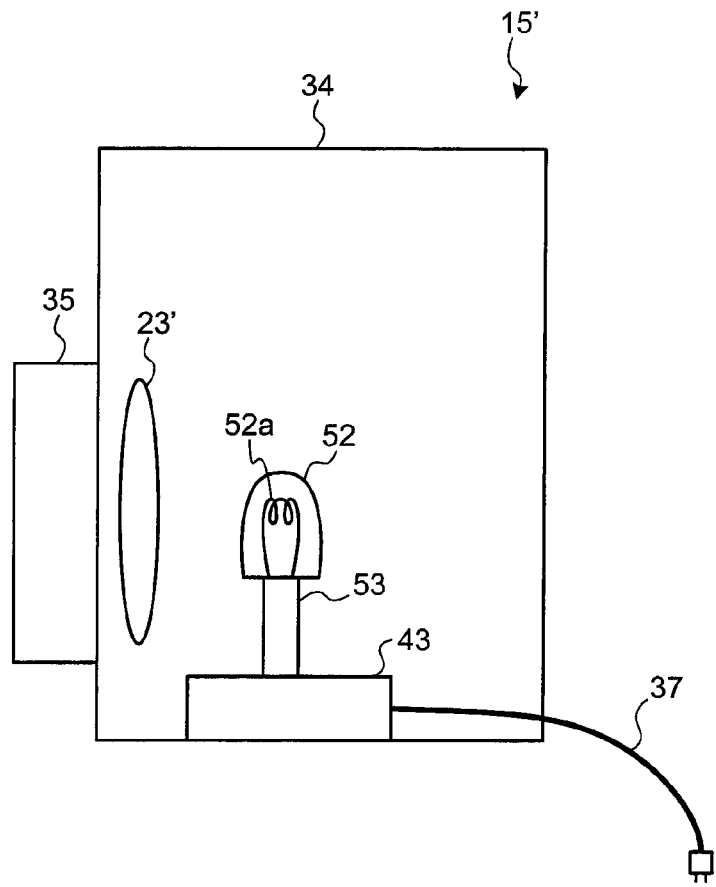
FIG. 3 is a schematic diagram of a lamphouse.

In the microscope 10 according to the first embodiment, the phosphor 22 having the same size as a filament of a halogen lamp is placed at the focal position of the collector lens 23 to employ an illumination optical system that is designed for the halogen lamp. Further, when the phosphor 22 having a size different from the filament of the halogen lamp is used, the focal distance of the collector lens 23 is changed according to the size of the phosphor 22 to employ components, other than a collector lens, of an illumination optical system that is designed for the halogen lamp. Consequently, a lamphouse 15 according to the first embodiment and a halogen lamphouse 15' as shown in FIG. 3 are replaceable; specifically, each of them is attached/detached to/from the microscope body 11.

Each of the lamphouse 15 and the halogen lamphouse 15' includes the exterior frame 34 and the connecting unit 35. In the exterior frame 34 of the halogen lamphouse 15', a collector lens 23', a halogen lamp 52, a lamp supporting adapter 53, and a lamp supporting member 43 are housed as shown in FIG. 3. A filament 52a of the halogen lamp 52 is located in the focal position of the collector lens 23'. The halogen lamp 52 is powered by the power supply through the cable 37 and the lamp supporting member 43.

Figure 4:
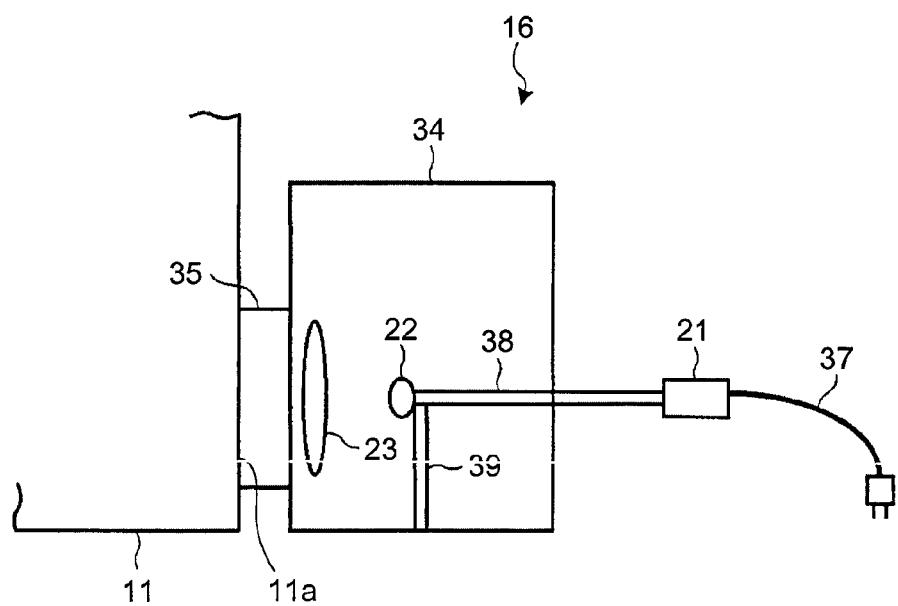
FIG. 4 shows a partial configuration of a microscope according to a second embodiment of the present invention.

FIG. 4 shows the configuration of a lamphouse 16 of a microscope according to a second embodiment of the present invention. In FIG. 4, the components denoted by the same reference numeral as those in FIGS. 1 to 3 represent the same components, and are not described again in detail.

The phosphor 22 and the collector lens 23 in the lamphouse 16 are housed in the exterior frame 34. The exterior frame 34 is detachably mounted to the mounting portion 11a of the microscope body 11 through the connecting unit 35. The phosphor 22 is located in the focal point of the collector lens 23 to establish Kohler illumination as well as in the first embodiment (see FIG. 1).

The excitation light source 21 for exciting the phosphor 22 is located outside the exterior frame 34. The phosphor 22 and the excitation light source 21 are optically connected to each other through an optical fiber 38. The phosphor 22 is located inside the exterior frame 34 and supported by the optical fiber 38. Specifically, one end of the optical fiber 38 is optically connected to the excitation light source 21 and another end (emitting end) holds the phosphor 22. The optical fiber 38, whose central portion (core) of has a refractive index higher than that of the surrounding portion (cladding), brings the excitation light to the phosphor 22. The optical fiber 38 is also supported by the fiber supporting member 39. The excitation light source 21 is powered by the power supply through the cable 37.

Figure 5:
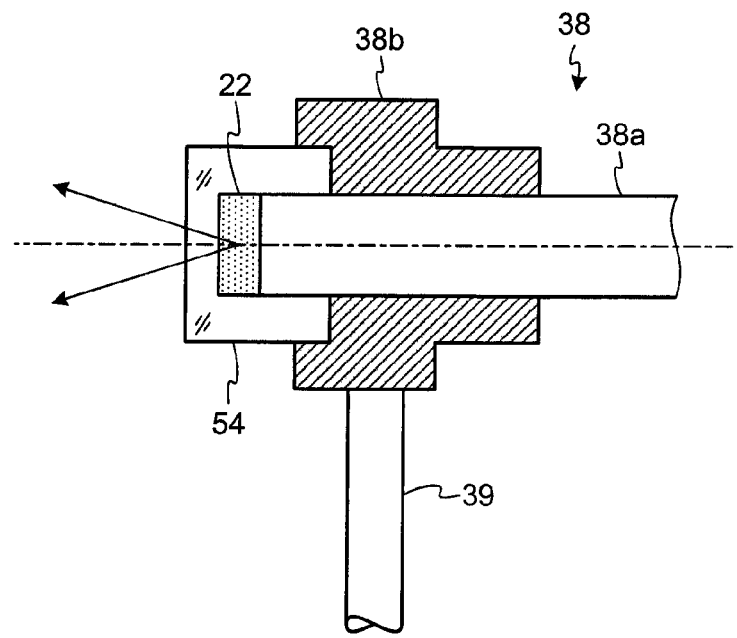
FIG. 5 shows a structure of an end portion of an optical fiber included in the microscope shown in FIG. 4.

FIG. 5 shows a structure that holds the phosphor 22 in the emitting end of the optical fiber 38. As shown in FIG. 5, the optical fiber 38 includes a holding member 38b surrounding a optical fiber line 38a at the emitting end portion. The phosphor 22 is held in a transparent holding member 54. The transparent holding member 54 is removable from the holding member 38b, i.e., the optical fiber 38; the phosphor 22 is removable from the transparent holding member 54. In other words, the phosphor 22 can be replaced with another phosphor capable of emitting light with, for example, different wavelength characteristics (spectral characteristics) to illuminate the specimen 27.

The works of the microscope 10 according to the second embodiment will be described below. The phosphor 22 absorbs the excitation light emitted from the excitation light source 21 through the optical fiber 38 to emit illumination light in a specific wavelength range. The illumination light emitted from the phosphor 22 turns to parallel light in the surface of the specimen 27 and illuminates the specimen 27 as well as in the first embodiment.

In the microscope 10 according to the second embodiment, since the excitation light source 21 is located outside the exterior frame 34, heat generated by the excitation light source 21 is not directly transmitted to the phosphor 22. As a result, it is possible to make the increased temperature of the microscope body 11 less than in the first embodiment.

Figure 6:
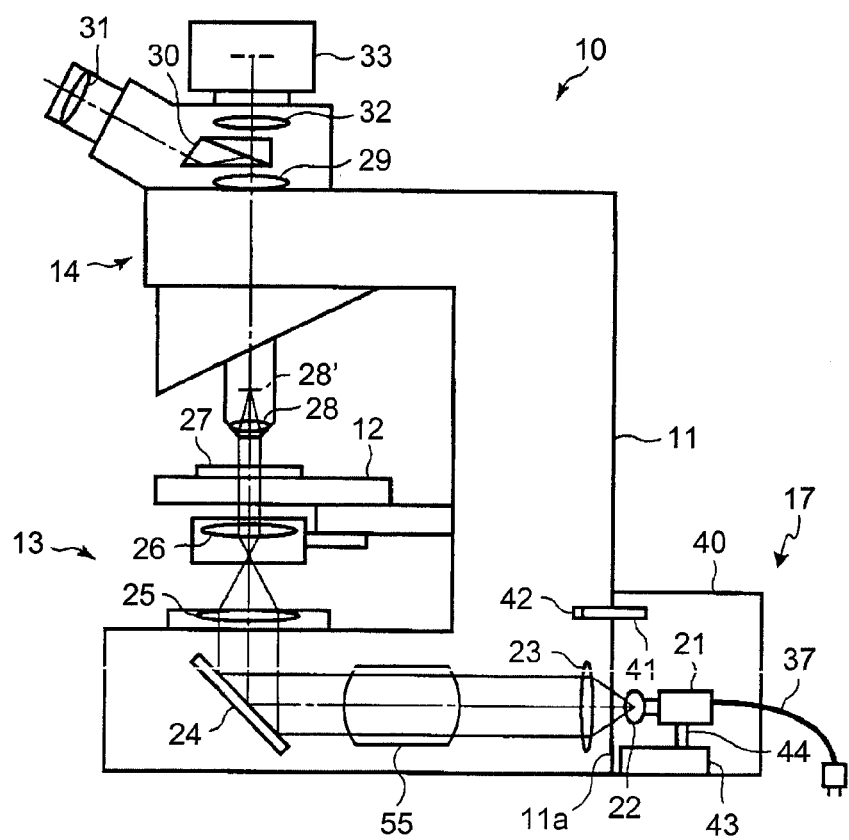
FIG. 6 shows a configuration of a microscope according to a third embodiment of the present invention.

FIG. 6 shows a configuration of a microscope according to a third embodiment of the present invention. In FIG. 6, the components denoted by the same reference numeral as those in FIGS. 1 to 5 represent the same components, and are not described again in detail.

The collector lens 23, which collects the illumination light emitted from the phosphor 22, is located inside the microscope body 11. The excitation light source 21 and phosphor 22 are housed in an exterior frame 40. The exterior frame 40 is the same as a conventional exterior frame for a halogen lamphouse. Accordingly, the exterior frame 40 can be replaced with the current exterior frame, and attached to and detached from the microscope body 11.

The exterior frame 40 (conventional exterior frame for a halogen lamphouse) houses a connecting member 41 that connects the exterior frame 40 to the microscope body 11, and the lamp supporting member 43 that supports a halogen lamp and feeds power from a power supply through the cable 37 to the halogen lamp. The exterior frame 40 is positioned by inserting the connecting member 41 having a projection into a connecting port 42 of the microscope body 11, and thus attached to the microscope body 11.

In the microscope 10 according to the third embodiment, a light-source supporting adapter 44 that supports the excitation light source 21, which illuminates and holds the phosphor 22, is mounted to the lamp supporting member 43 of the current halogen lamphouse. When the excitation light source 21 is connected to the light-source supporting adapter 44 that is made from insulating material, the phosphor 22 is located in the focal position of the collector lens 23. In the microscope 10 according to the third embodiment, the lamp supporting member 43 and the light-source supporting adapter 44 are served as an illuminating unit together with the illumination optical system 13. The illumination optical system 13 also includes a zoom lens 55 in addition to the components of the illumination optical system 13 according to the first and second embodiments.

The current halogen lamphouse is a lamphouse that includes a halogen lamp a filament image of which is focused on a focal plane of the condenser 26 through the collector lens 23, the zoom lens 55, and the window lens 25 in the illumination optical system 13. The current halogen lamphouse has, for example, a configuration that includes the connecting member 41 shown in FIG. 6 instead of the connecting unit 35 in the halogen lamphouse 15' shown in FIG. 3.

A lamphouse 17 according to the third embodiment includes the exterior frame 40 and other components mounted inside and outside the exterior frame 40. The phosphor 22 in the lamphouse 17 preferably has a size that a conjugate of the phosphor 22 is imaged to have a desired size by the collector lens 23, the zoom lens 55, and the window lens 25 when the lamphouse 17 is mounted to the mounting portion 11a. In other words, the size of the phosphor 22 is preferably the same as the filament of the halogen lamp in the current lamphouse.

If the phosphor 22 is not the same size as the filament of the halogen lamp, the focal distance of the zoom lens 55 is changed according to the size of the phosphor 22 so that the conjugate image of the phosphor 22 that is focused on the focal plane of the condenser 26 has a desired size, i.e., the same size as the filament image of the halogen lamp. Accordingly, the lamphouse 17 or the current halogen lamphouse is replaceable, and can be attached to and detached from the microscope body 11.

The zoom lens 55 in the illumination optical system 13 is configured to use a plurality of lenses. The focal distance of the whole zoom lens 55 can be changed by shifting all or some lenses of the zoom lens 55 in a direction of the optical axis. In the microscope according to the third embodiment, the conjugated image of the phosphor 22 can become a desired size by replacing the collector lens 23 with another one, as well as in the first and second embodiments.

The works of the microscope 10 according to the third embodiment will be described below. The phosphor 22 is located in the focal position of the collector lens 23, and the illumination light emitted from the phosphor 22 turns to parallel light in the surface of the specimen 27 and illuminates the specimen 27, as well as in the first and second embodiments.

In the microscope 10 according to the third embodiment, the halogen lamp in the current halogen lamphouse can be replaced with a structure that includes the phosphor 22, the excitation light source 21, and the light-source supporting adapter 44. Accordingly, the microscope 10 can use the current conventional halogen lamphouse. The whole lamphouse may be replaced with another lamphouse. As a result, the halogen lamp in the microscope 10 is compatible with the current conventional halogen lamp.

In the third embodiment, a positioning mechanism that includes a connecting member 41 having a projection and the connecting port 42 of the microscope body 11 but is not limited thereto. Other positioning mechanism may be used.

Figure 7:
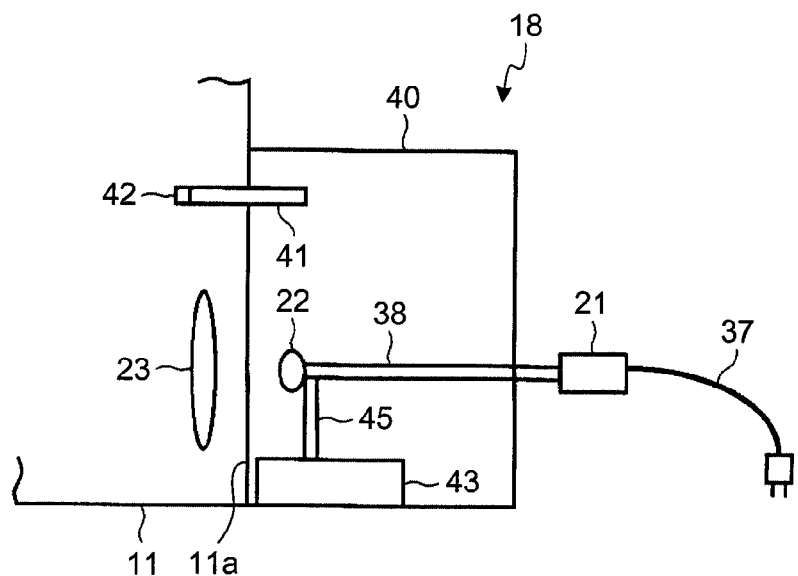
FIG. 7 shows a partial configuration of a microscope according to a fourth embodiment of the present invention.

FIG. 7 shows a configuration of a lamphouse 18 that is included in a microscope according to a fourth embodiment of the present invention. In FIG. 7, the components denoted by the same reference numeral as those in FIGS. 1 to 6 represent the same components, and are not described again in detail.

In the lamphouse 18, a fiber supporting adapter 45 that supports the optical fiber 38 is mounted on the lamp supporting member 43. The optical fiber 38 brings the excitation light emitted from the excitation light source 21 to the phosphor 22. When the optical fiber 38 is connected to the fiber supporting adapter 45 that is made from insulating material, the phosphor 22 is located in the focal position of the collector lens 23. The excitation light source 21 is powered by a power supply through the cable 37.

The works of the microscope 10 according to the fourth embodiment will be described below. The phosphor 22 is located in the focal position of the collector lens 23, and the illumination light emitted from the phosphor 22 turns to parallel light in the surface of the specimen 27 and illuminates the specimen 27, as well as in the first embodiment.

In the microscope 10 according to the fourth embodiment, the halogen lamp in the current halogen lamphouse can be replaced with a structure that includes the phosphor 22, the excitation light source 21, and the fiber supporting adapter 45. Accordingly, the microscope 10 can use the current conventional halogen lamphouse. The whole lamphouse may be replaced with another lamphouse. As a result, the halogen lamp in the microscope 10 is compatible with the current conventional halogen lamp.

Figure 8:
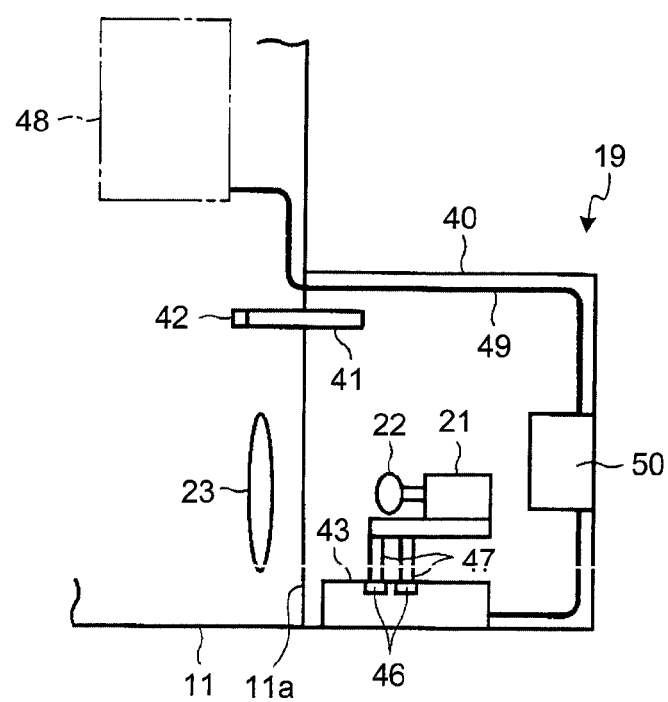
FIG. 8 shows a partial configuration of a microscope according to a fifth embodiment of the present invention.

FIG. 8 shows a configuration of a lamphouse 19 that is included in a microscope according to a fifth embodiment of the present invention. In FIG. 8, the components denoted by the same reference numeral as those in FIGS. 1 to 7 represent the same components, and are not described again in detail.

The lamp supporting member 43 includes an entry 46 into which an electrode of the halogen lamp is inserted. The halogen lamp is positioned when the electrode is inserted into the entry 46. The entry 46 is electrically connected to an internal power source 48 inside the microscope body 11. The phosphor 22 is held by the excitation light source 21. The excitation light source 21 includes an electrode 47 for receiving power. The excitation light source 21 is also positioned and secured with the electrode 47 inserted into the entry 46. When the excitation light source 21 is inserted into the entry 46, the phosphor 22 is located in the focal position of the collector lens 23.

The entry 46 of the lamp supporting member 43 is electrically connected to the internal power source 48 of the microscope body 11 by a cable 49, and thus the excitation light source 21 is powered by the internal power source 48. A transformer 50 that transforms power supplied from the internal power source 48 to power suitable for the excitation light source 21 is located on the cable 49.

The internal power source 48, the cable 49, and the transformer 50 are used after automatically switched from the external power supply for the halogen lamp by a switch (not shown).

The works of the microscope 10 according to the fifth embodiment will be described below. The illumination light emitted from the phosphor 22 turns to parallel light in the surface of the specimen 27 and illuminates the specimen 27, as well as in the first embodiment.

In the microscope 10 according to the fifth embodiment, to employ the phosphor 22 as an illumination light source, the current conventional halogen lamphouse can be used by supplying power to the excitation light source 21 from the internal power source 48 of the microscope body 11.

Figure 9:
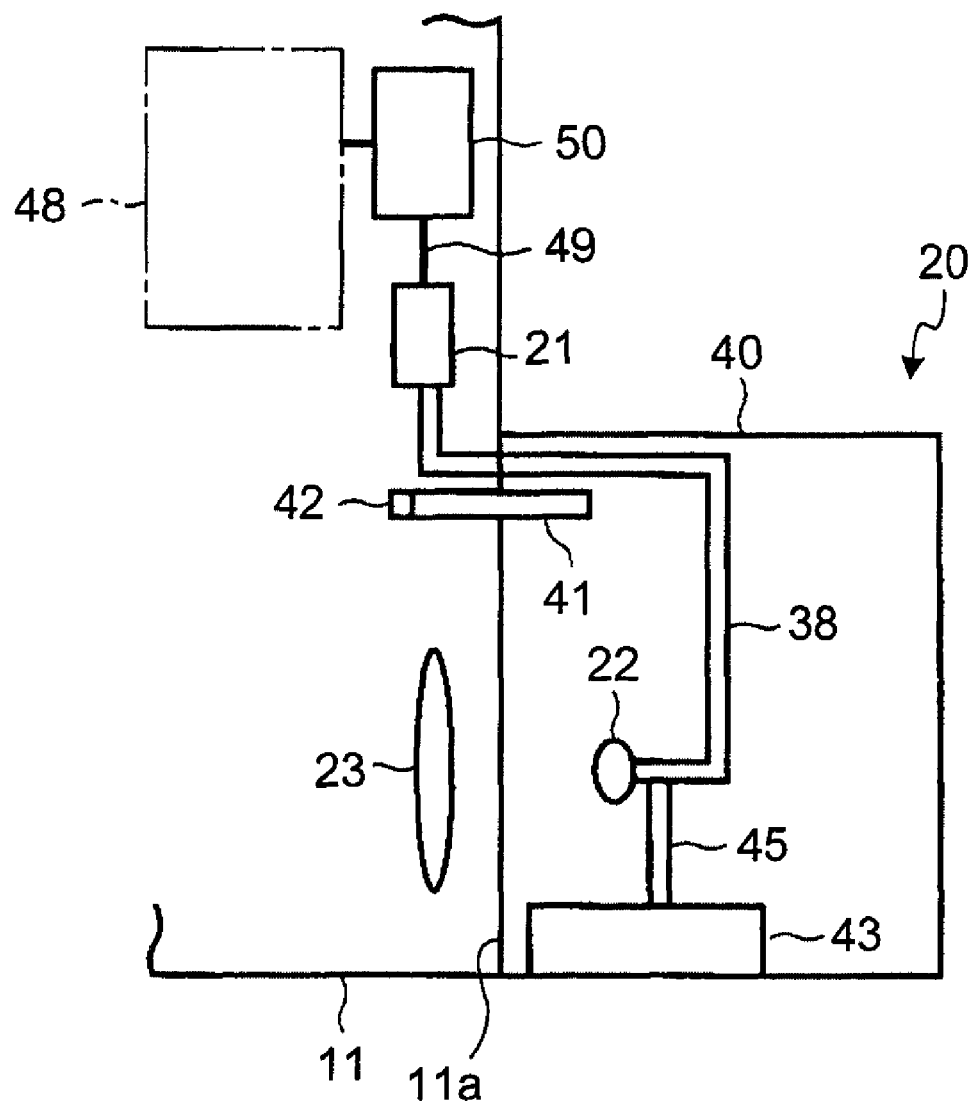
FIG. 9 shows a partial configuration of a microscope according to a sixth embodiment of the present invention.

FIG. 9 shows a configuration of a lamphouse 18 that is included in a microscope according to a sixth embodiment of the present invention. In FIG. 9, the components denoted by the same reference numeral as those in FIGS. 1 to 8 represent the same components, and are not described again in detail.

The fiber supporting adapter 45 that supports the optical fiber 38 is mounted on the lamp supporting member 43. The optical fiber 38 brings the excitation light emitted from the excitation light source 21 to the phosphor 22. The phosphor 22 is secured to the end portion of the optical fiber 38. When the optical fiber 38 is connected to the fiber supporting adapter 45 that is made from insulating material, the phosphor 22 is located in the focal position of the collector lens 23.

The excitation light source 21 is electrically connected to the internal power source 48 of the microscope body 11 by the cable 49, and thus the excitation light source 21 is powered by the internal power source 48. The transformer 50 that transforms power supplied from the internal power source 48 to power suitable for the excitation light source 21 is located on the cable 49.

In the microscope 10 according to the sixth embodiment, to employ the phosphor 22 as an illumination light source, the current conventional halogen lamphouse can be used by supplying power to the excitation light source 21 from the internal power source 48 of the microscope body 11.

The microscopes according to the embodiments as describe above use a transmitting illumination optical system. The transmitting illumination optical system may be replaced with an incident-light illumination optical system. Specifically, a phosphor that receives excitation light and thus emits an illumination light in a specific wavelength range, and an excitation light source that illuminates the phosphor with the excitation light may be replaced with the light source for the incident-light illumination optical system.

The illumination optical system may establish critical illumination instead of Kohler illumination. Specifically, a phosphor that receives excitation light and thus emits an illumination light in a specific wavelength range, and an excitation light source that illuminates the phosphor with the excitation light may be replaced with the light source for the critical illumination optical system.

The excitation light source 21 may be configured to emit excitation light in the ultraviolet wavelength range; the phosphor 22 may be configured to receive the excitation light in the ultraviolet wavelength range and thus to emit white illumination light. In this configuration, even if the excitation light in the ultraviolet wavelength range after passing through the phosphor 22 is added to the white illumination light in the visible range, color balance in the visible range, i.e., wavelength characteristics (spectral characteristics) is not disrupted. Accordingly, white balance is adjusted using a fixed reference.

The illumination light emitted from the phosphor has a specific spectrum intensity distribution (spectral characteristics) regardless of the intensity of the illumination light. Consequently, once the white balance of the camera is set in accordance with intensity distribution of the phosphor, resetting the white balance with every light adjustment is not required.

An excitation-light cut filter that shields the excitation light which is emitted from the excitation light source 21 and then passes through the phosphor 22 may be located between the phosphor 22 and the specimen 27 to prevent a mixture of the excitation light after passing through the phosphor 22 and the illumination light from illuminating the specimen 27. Accordingly, when the excitation light is a high power or high energy light such as ultraviolet light, damages to and discoloration of the specimen 27 are reduced. When the excitation light is visible light and the illumination light emitted from the phosphor 22 is white light, the illumination light on the specimen 27 is maintained with a spectrum intensity distribution unique to the phosphor 22. The excitation-light cut filter is preferably provided together with the phosphor 22. For example, the transparent holding member 51 shown in FIG. 2 and the transparent holding member 54 shown FIG. 5 are formed from filter material so that at least a portion through which the illumination light passes functions as the excitation-light cut filter.

Figure 10:
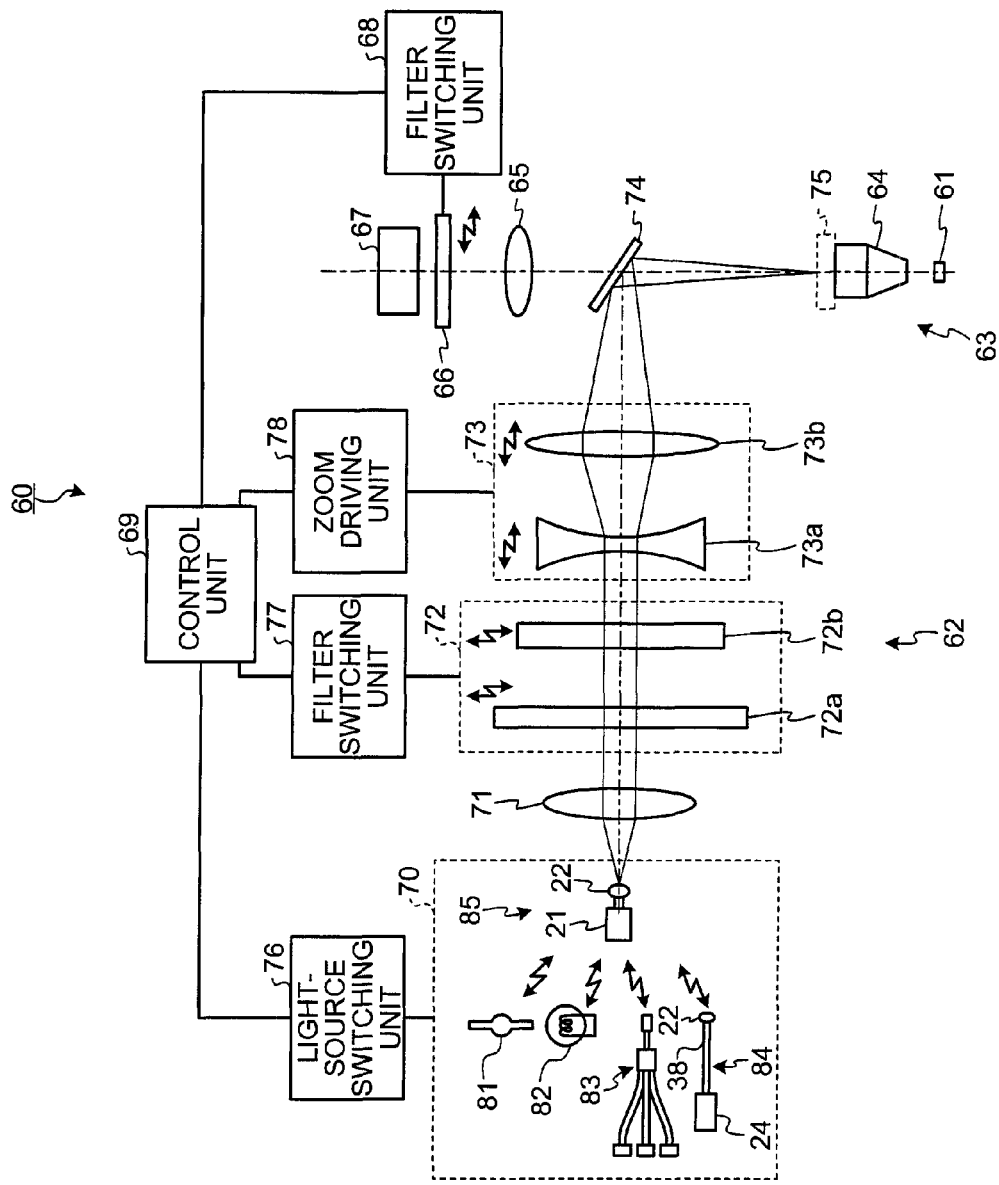
FIG. 10 shows a configuration of main components of a microscope according to a seventh embodiment of the present invention.

A microscope according to the seventh embodiment of the present invention will be described below. FIG. 10 shows a configuration of main components of the microscope 60 according to the seventh embodiment of the present invention. As shown in FIG. 10, the microscope 60 includes an illumination system 62 for illuminating a specimen 61, and an observation system for observing the specimen 61 illuminated by the illumination system 62. The specimen 61 is held by, for example, a stage mechanism (not shown). In FIG. 10, the components denoted by the same reference numeral as those of the first to sixth embodiments represent the same components, and are not described again in detail.

The observation system 63 includes an observation optical system and allows observation using a captured observation image of the specimen 61 illuminated by the illumination system 62. The observation optical system includes an objective lens 64, an imaging lens 65, an infrared cut filter 66, and an imaging device 67. The objective lens 64 includes a plurality of objective lenses each having different numerical aperture (NA) and magnification. One of the objective lenses is selectively placed in an observation optical path by a selection mechanism (not shown). The infrared cut filter 66 is placed in or removed from the observation optical path by a filter driving unit 68. For example, when a light source that causes high temperature heat or a light source that emits light with an undesired infrared component is selected and placed, the light source is inserted in the observation optical path; otherwise, the light source is removed from the observation optical path. The imaging device 67 includes, for example, a charge-coupled device (CCD) or a CMOS image sensor, captures an observation image, and outputs the generated image data to other unit such as a display unit or a storage unit.

The illumination system 62 includes an incident-light illumination optical system to establish Kohler illumination for the specimen 61. The incident-light illumination optical system includes a light source unit 70 that has replaceable light sources, a collector lens 71, a filter unit 72 that changes the spectral characteristics of the illumination light illuminating the specimen 61, a zoom lens 73 that images a light source image 75 in cooperation with the collector lens 71, a half mirror 74 that brings the illumination light into the observation optical path, and the objective lens 64.

The light source unit 70 includes a plurality of light sources each having different spectral characteristics of the light emitted as the illumination light. One of the light sources is selected and placed by a light-source switching unit 76 with respect to the collector lens 71. Specifically, the emitting element of the selected light source is placed in the focal plane of the collector lens 71. The light source unit 70 includes, for example, a mercury lamp 81, a halogen lamp 82, a color-mixture type white light source unit 83, a fluorescent light source unit 84 as shown in FIG. 4, and a florescent light source unit 85 as shown in FIG. 1.

Figure 11:
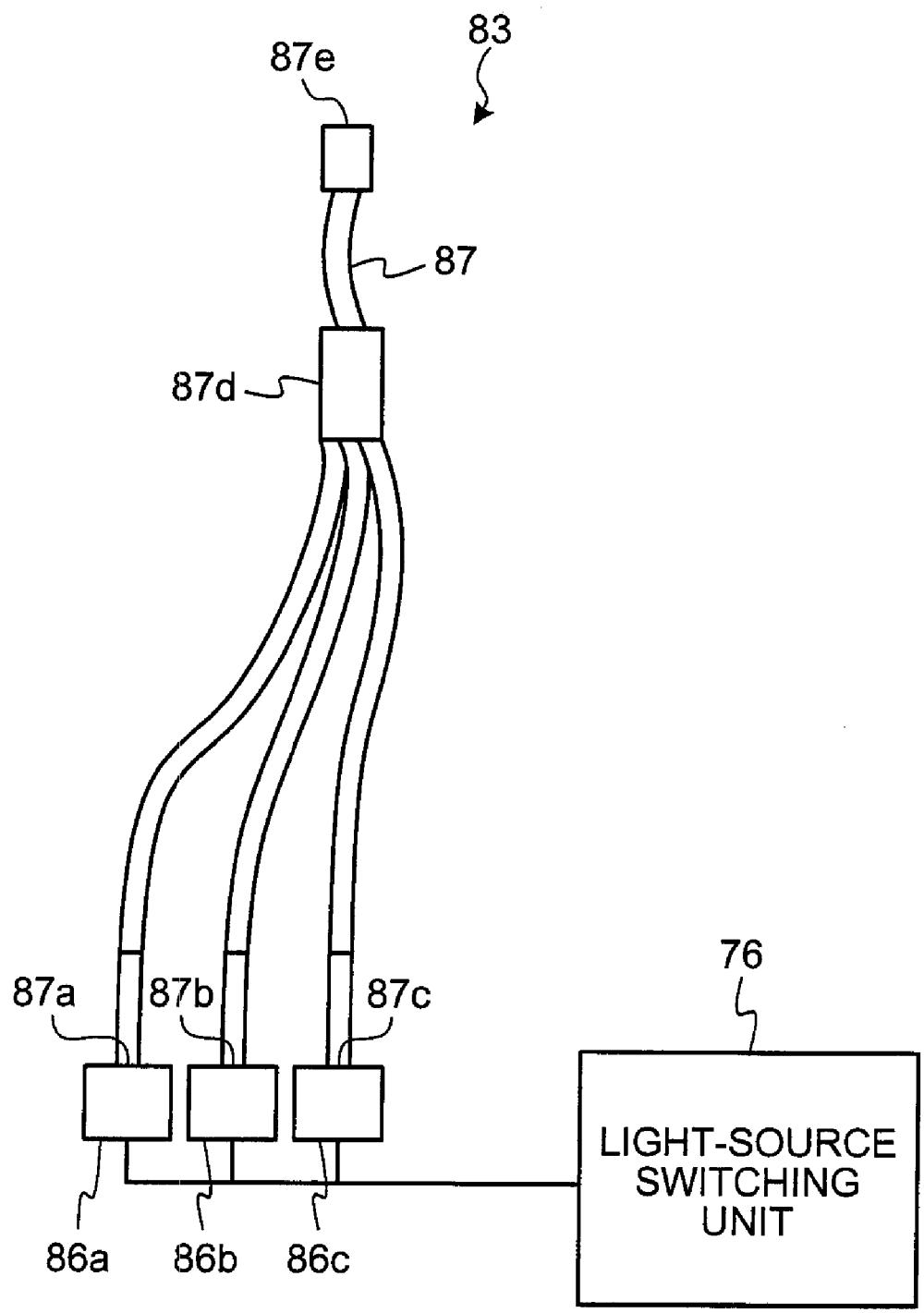
FIG. 11 shows a configuration of a white light source included in the microscope shown in FIG. 10.

The color-mixture type white light source unit 83 includes light-emitting elements 86a, 86b, and 86c that each have a different wavelength range, and a three-arm light guide 87 as shown in FIG. 11. The light-emitting elements 86a, 86b, and 86c are optically connected to arm ends 87a, 87b, and 87c of the three-arm light guide 87, respectively. Light emitted from the light-emitting elements 86a, 86b, and 86c are introduced into the three-arm light guide 87 through the arm ends 87a, 87b, and 87c, respectively. The light introduced from the arm ends 87a, 87b, and 87c is mixed by a combiner 87d and output from an exit 87e.

Accordingly, the color-mixture type white light source unit 83 emits light with a spectral distribution that is a mixture of the spectrum intensity distributions of the emitting elements 86a, 86b, and 86c as illumination light. Each of the emitting elements 86a, 86b, and 86c are on-off controlled according to instructions by the light-source switching unit 76. The color-mixture type white light source unit 83, thus, can emit illumination light with a desired spectral distribution mixed using the spectrum intensity distributions of the emitting elements 86a, 86b, and 86c. The color-mixture type white light source unit 83 uses three light sources but not limited thereto, and may use less or more than three light sources. Each of the light sources may use various light sources such as an LED, a laser diode (LD), and a phosphor for laser excitation.

The filter unit 72 includes a heat-absorbing filter 72a and a color conversion filter 72b. Each of the heat-absorbing filter 72a and the color conversion filter 72b is placed in or removed from an illumination optical path by the filter switching unit 77, depending on the light source selected by the light source unit 70. For example, when a high-temperature light source such as the mercury lamp 81 or the halogen lamp 82 is selected and placed, the heat-absorbing filter 72a is inserted in the illumination optical path; otherwise, the heat-absorbing filter 72a is removed from the illumination optical path. The color conversion filter 72b preferably includes a plurality of filters each having different color conversion characteristics; each of the filters is placed in or removed from the illumination optical path by the filter switching unit 77. The filter unit 72 may include other replaceable filter, for example, an infrared cut filter.

The zoom lens 73 includes a concave lens 73a and a convex lens 73b. Each of the concave lens 73a and the convex lens 73b is shifted in the illumination optical path by a zoom driving unit 78 in accordance with the light source selected in the light source unit 70 and the objective lens 64 located in the observation optical path. The zoom lens 73 extends the composite focal distance by placing the concave lens 73a and the convex lens 73b close to each other and reduces the composite focal distance by placing the concave lens 73a and the convex lens 73b away from each other. Accordingly, the zoom lens 73 zooms in the light source image 75 by reducing the distance between the lenses and zooms out the light source by extending the distance.

In other words, the zoom lens 73 can maintain the light source image 75 at the best size based on the size of the emitting element of the light source selected in the light source unit 70 and the size of the pupil of the objective lens 64 selected in the observation optical system 62. The best size of the light source image is, for example, a size that the light source image 75 circumscribes the pupil on the pupil plane of the objective lens 64. If the light source image 75 is rectangular with respect to the pupil which is generally round, the best size is a size that at least two sides of the rectangular image circumscribes the pupil. This optimization of the size of the light source image 75 with respect to the pupil of the objective lens 64 allows very effective and efficient utilization of the light emitted from the selected light source in the light source unit 70.

Each of the concave lens 73a and the convex lens 73b is shown as a single lens in FIG. 10 but may be a group of lenses. The zoom lens 73 may include more than two lens groups including a group of concave lenses and a group of convex lenses.

The microscope 60 as described above allows the user to switch or change the optical components by manually operating the light source switching unit 76, the filter switching units 68 and 77, and the zoom driving unit 78. Alternatively, the microscope 60 can automatically control switching or changing of the optical components by using a control unit 69 that electrically connected to the light source switching unit 76, the filter switching units 68 and 77, and the zoom driving unit 78. The control unit 69 includes a table in which desired combinations of the components and parameters are recorded, and refers to the table to automatically change the setting of the components based on switching information on the light sources in the light source unit 70 and switching information on the objective lens 64. The table has, for example, combinations of the light sources in the light source unit 70, the lenses in the objective lens 64, the filters in the filter unit 72, the infrared cut filter 66, and zoom positions of lenses in the zoom lens 73.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
an excitation light source which emits an excitation light in an ultraviolet wavelength range;
a phosphor which receives the excitation light and emits illumination light in a specific wavelength range;
a microscope body which includes an illuminating unit including a collector lens collecting the illumination light and illuminating a specimen by the illumination light, and which includes an internal power source for supplying power to at least a portion of the illuminating unit and to the excitation light source, wherein the internal power source is switchable to supply power to a halogen lamp and to the excitation light source;
an observation unit for observing the specimen illuminated by the illuminating unit; and
a lamphouse that is detachably mountable to the microscope body, and that includes a lamp supporting member for replaceably supporting the excitation light source, which is adapted to be electrically connected thereto, wherein:
one of the microscope body and the lamphouse comprises a transformer for transforming the power supplied from the internal power source into power suitable for the excitation light source when the excitation light source is connected to the lamp supporting member,
the illuminating unit includes an excitation-light cut filter that shields the excitation light after passing the phosphor,
the illuminating unit includes a light-source supporting adapter which supports the excitation light source, and includes the lamp supporting member on which the light-source supporting adapter is mounted, wherein the light-source supporting adapter is replaceable at least with the halogen lamp,
the light-source supporting adapter positions the phosphor at a focal position of the collector lens when mounted on the lamp supporting member,
the phosphor is replaceably located at the focal position of the collector lens when the lamphouse is mounted to a mounting part of the microscope body, the phosphor being located inside the microscope body,
the illuminating unit images a conjugate image of the phosphor, and
the conjugate image of the phosphor has an image size that is the same as an image size of a filament of the halogen lamp.

2. A microscope comprising:
an excitation light source which emits an excitation light;
a phosphor which receives the excitation light and emits illumination light in a specific wavelength range;
an illuminating unit which includes a collector lens collecting the illumination light, and which illuminates a specimen by the illumination light; and
an observation unit for observing the specimen illuminated by the illuminating unit,
wherein:
the illuminating unit includes a light-source supporting adapter which supports the excitation light source, and a lamp supporting member on which the light-source supporting adapter is mounted, wherein the light-source supporting adapter is replaceable at least with a halogen lamp,
the illuminating unit images a conjugate image of the phosphor,
the phosphor is replaceable with the halogen lamp, and
the illuminating unit images the conjugate image of the phosphor at a magnification based on a size of the phosphor so that the conjugate image of the phosphor has a predetermined size.

3. The microscope according to claim 2, wherein:
the light-source supporting adapter positions the phosphor at a focal position of the collector lens when mounted on the lamp supporting member, and
the phosphor is replaceably located at the focal position of the collector lens when a lamphouse is mounted to a mounting part of a microscope body, the phosphor being located inside the microscope body.

4. The microscope according to claim 2, wherein the illuminating unit changes a focal distance of the collector lens according to the size of the phosphor so that the conjugate image of the phosphor has the predetermined size.

5. The microscope according to claim 2, wherein the conjugate image of the phosphor has an image size that is the same as an image size of a filament of the halogen lamp.

6. A microscope comprising:
an excitation light source which emits an excitation light;
a phosphor which receives the excitation light and emits illumination light in a specific wavelength range;
a microscope body which includes an illuminating unit including a collector lens collecting the illumination light and illuminating a specimen by the illumination light, and which includes an internal power source for supplying power to at least a portion of the illuminating unit and to the excitation light source, wherein the internal power source is switchable to supply power to a halogen lamp and to the excitation light source;
an observation unit for observing the specimen illuminated by the illuminating unit; and
a lamphouse that is detachably mountable to the microscope body, and that includes a lamp supporting member for replaceably supporting the excitation light source, which is adapted to be electrically connected thereto,
wherein one of the microscope body and the lamphouse comprises a transformer for transforming the power supplied from the internal power source into power suitable for the excitation light source when the excitation light source is connected to the lamp supporting member.

7. The microscope according to claim 6, wherein the illuminating unit includes a light-source supporting adapter that supports the excitation light source, and includes the lamp supporting member on which the light-source supporting adapter is mounted, wherein the light-source supporting adapter is replaceable at least with the halogen lamp.

8. The microscope according to claim 6, wherein:
the light-source supporting adapter positions the phosphor at a focal position of the collector lens when mounted to the lamp supporting member, and
the phosphor is replaceably located at the focal position of the collector lens when the lamphouse is mounted to a mounting part of the microscope body, the phosphor being located inside the microscope body.

* * * * *